(12) United States Patent
Kim

(10) Patent No.: US 7,552,951 B2
(45) Date of Patent: Jun. 30, 2009

(54) LOCKING STRUCTURE OF TRAY OF VEHICLE

(75) Inventor: Keun Chul Kim, Anseong-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 177 days.

(21) Appl. No.: 11/468,094

(22) Filed: Aug. 29, 2006

(65) Prior Publication Data

US 2007/0080553 A1   Apr. 12, 2007

(30) Foreign Application Priority Data

Oct. 10, 2005   (KR)   ...................... 10-2005-0095007

(51) Int. Cl.
E05C 19/10   (2006.01)
E05C 19/12   (2006.01)

(52) U.S. Cl. .................. 292/113; 292/121; 292/126; 292/128; 292/DIG. 11; 292/DIG. 37; 292/DIG. 63

(58) Field of Classification Search ............... 292/95, 292/100, 108, 113, 121, 126, 128, DIG. 11, 292/DIG. 37, DIG. 38, DIG. 63
See application file for complete search history.

(56) References Cited

U.S. PATENT DOCUMENTS

| 970,133 | A | * | 9/1910 | Strid ..................... 384/190.7 |
| 2,054,907 | A | * | 9/1936 | Mollet ....................... 292/126 |
| 2,726,108 | A | * | 12/1955 | Falk ........................... 292/106 |
| 3,455,590 | A | * | 7/1969 | Zerfoss ..................... 292/128 |
| 3,918,751 | A | * | 11/1975 | Blake ........................ 292/126 |
| 4,235,462 | A | * | 11/1980 | Torii et al. ................ 292/216 |
| 4,424,993 | A | * | 1/1984 | Shelby et al. ............... 292/128 |
| 4,739,896 | A | * | 4/1988 | Moss ......................... 52/169.6 |
| 5,484,178 | A | * | 1/1996 | Sandhu et al. .............. 292/173 |
| 5,630,630 | A | * | 5/1997 | Price et al. .................. 292/128 |
| 6,568,719 | B2 | * | 5/2003 | Buscella ....................... 292/85 |
| 6,854,778 | B2 | | 2/2005 | Lee |
| 7,261,332 | B1 | * | 8/2007 | Petersen et al. ............. 292/121 |
| 7,269,981 | B2 | * | 9/2007 | Kwon ........................... 68/3 R |
| 2005/0133523 | A1 | | 6/2005 | Kim |

FOREIGN PATENT DOCUMENTS

JP   2002-322854   11/2002
JP   2005-178672   7/2005

OTHER PUBLICATIONS

English Language Abstract of JP 2002-322854.
English Language Abstract of JP 2005-178672.

* cited by examiner

*Primary Examiner*—Carlos Lugo
(74) *Attorney, Agent, or Firm*—Greenblum & Bernstein, P.L.C.

(57) ABSTRACT

A tray locking structure of a vehicle includes a housing installed in an inner panel of the vehicle, having an accommodating room, an installation recess formed in a front side thereof, and a locking bar that crosses the installation recess; a door hinged to a rear side of the housing that can move up and down to thus open and close the door; and a locking part installed in a front side of the door, having a locking body, a locking step provided in a lower end of the locking body and locked by the locking bar, an upper end pulled forward to release the locking part from the locking bar, a plurality of rotation protrusions provided on lateral sides of the locking body, and a button including an insertion plate having a plurality of insertion holes such that the rotation protrusions are respectively inserted into the insertion holes.

6 Claims, 5 Drawing Sheets

LOCKING STRUCTURE OF TRAY OF VEHICLE

BACKGROUND OF THE INVENTION

1. Field of the Invention

The present invention relates to a tray locking structure of a vehicle in which when a button of a locking part installed in a door of the vehicle is pulled forward, the tray is released from the locked state such that the door of the tray is prevented from opening due to external shock and accident is prevented

2. Description of the Related Art

Generally, an instrument panel of a vehicle includes various meters in the side of a driver seat and a glove box in the side of a front passenger seat.

Between the driver seat and the front passenger seat a center facea is formed. On the upper side of the center faced, an upward opening tray is installed to accommodate glasses.

FIG. 1 is an exploded perspective view illustrating a conventional tray of a vehicle whose button is pressed down to open it, FIG. 2 is a view illustrating the button in a closed state of the tray in FIG. 1, and FIG. 3 is a view illustrating the button pressed down in the state shown in FIG. 2.

As shown in the drawings, the tray 1 includes a housing 10 installed in the upper side of the instrument panel of a vehicle, a door 20 hinged to the upper side of the housing 10 to open the upper side of the housing 10, and a cover 30 for covering the upper side of the door 20.

The housing 10 has an opened upper side, an accommodating room 11 for accommodating articles, and an installation recess 12 for accommodating a button of the door 20.

The rear side of the door 20 is rotatably hinged to a coupling plate 16 formed in the rear side of the housing 10 directly or by a bracket. The front side of the door 20 has a button unit 21 to be inserted into and locked by or released from the installation recess 12.

The cover 30 is coupled with the upper side of the door 20 and is formed with a through-hole for a part of the button unit 21 to protrude through.

Meanwhile, the button unit 21 includes a button 22, a hook 23, and a fixed plate 24.

The fixed plate 24 is fastened to an installation hole 29 formed in the front side of the door 20 by screws, the hook 23 having a locking protrusion 23a formed in the end thereof is rotatably coupled in the fixed plate 24 by pins 25, the button 22 traveling up and down is coupled with the upper side of the hook 23.

Pin springs 25a are installed to the pins 25 positioned at the places where the hook 23 and the fixed plate 24 are coupled with each other so that when pressure against the button is released, the button 22 can be returned to the original position.

Moreover, into the installation recess 12 of the housing 10, a supporting box 14 having a spring 13 is inserted to push the hook 23 upward.

Thus, the button unit 21 is assembled and installed to the door 20, the cover 30 is coupled with the upper side of the door 20, and the door equipped with the cover 30 is hinged to the housing 10.

In this case, in the state of the tray 1 being closed as shown in FIG. 2, the locking protrusion 23a formed in the lower end of the hook 23 of the button unit 21 is fixed to a locking step 15 of the housing 10.

In the above state, as shown in FIG. 3, when a user presses the button 22 down, the hook 23 rotates about the pins 25 so that the locking protrusion 23a is released from the locking step 15.

Thus, due to the elastic restoring force of the spring 13 installed in the installation recess 12 of the housing 10, the supporting box 14 pushes the hook 23 upward so that the door 20 is released from the locked state and protrudes upward.

At that time, when the force applied to the button 22 is released, due to the pin springs 25a, the hook 23 is returned to its original state and the button 22 is returned to its original state.

However, when shock is applied to the instrument panel in which the tray is installed, the ring of the button unit is minutely rotated in the direction where the shock is applied. Generally, since the shock is generated from the front side of the tray, the ring rotates forward due to the shock, so that the locking protrusion of the ring is separated from the locking step to release the locked state of the door.

SUMMARY OF THE INVENTION

Therefore, the present invention has been made in view of the above and/or other problems, and it is an object of the present invention to provide a tray locking structure of a vehicle in which a button is pulled forward to release a door to prevent the tray from being opened by shock applied from the front side thereof.

In accordance with the present invention, the above and other aspects can be accomplished by the provision of a tray locking structure of a vehicle including a housing installed in an inner panel of the vehicle, having an accommodating room, an installation recess formed in the front side thereof, and a locking bar for crossing the locking recess, a door hinged to the rear side of the housing that can move up and down to thus open and close the door, and a locking part installed in the front side of the door, having a lower end locked by the locking bar, an upper end pulled forward to release the locking part from the locking bar.

The button of the locking part is pulled forward to open the door so that the locking part is not released from the locking state due to external shock so as to prevent accident.

BRIEF DESCRIPTION OF THE DRAWINGS

These and/or other aspects and advantages of the present invention will be come apparent and more readily appreciated from the following description of the embodiments, taken in conjunction with the accompanying drawings, in which.

DESCRIPTION OF THE PREFERRED EMBODIMENTS

Hereinafter, the preferred embodiment of the tray locking structure of a vehicle according to the present invention will be described in detail with reference to the accompanying drawings.

The preferred embodiments will be not described to limit the scope of the present invention, but as examples, and it could be understood that there are several embodiments that may be implemented in the spirit of the present invention.

Figure 1:
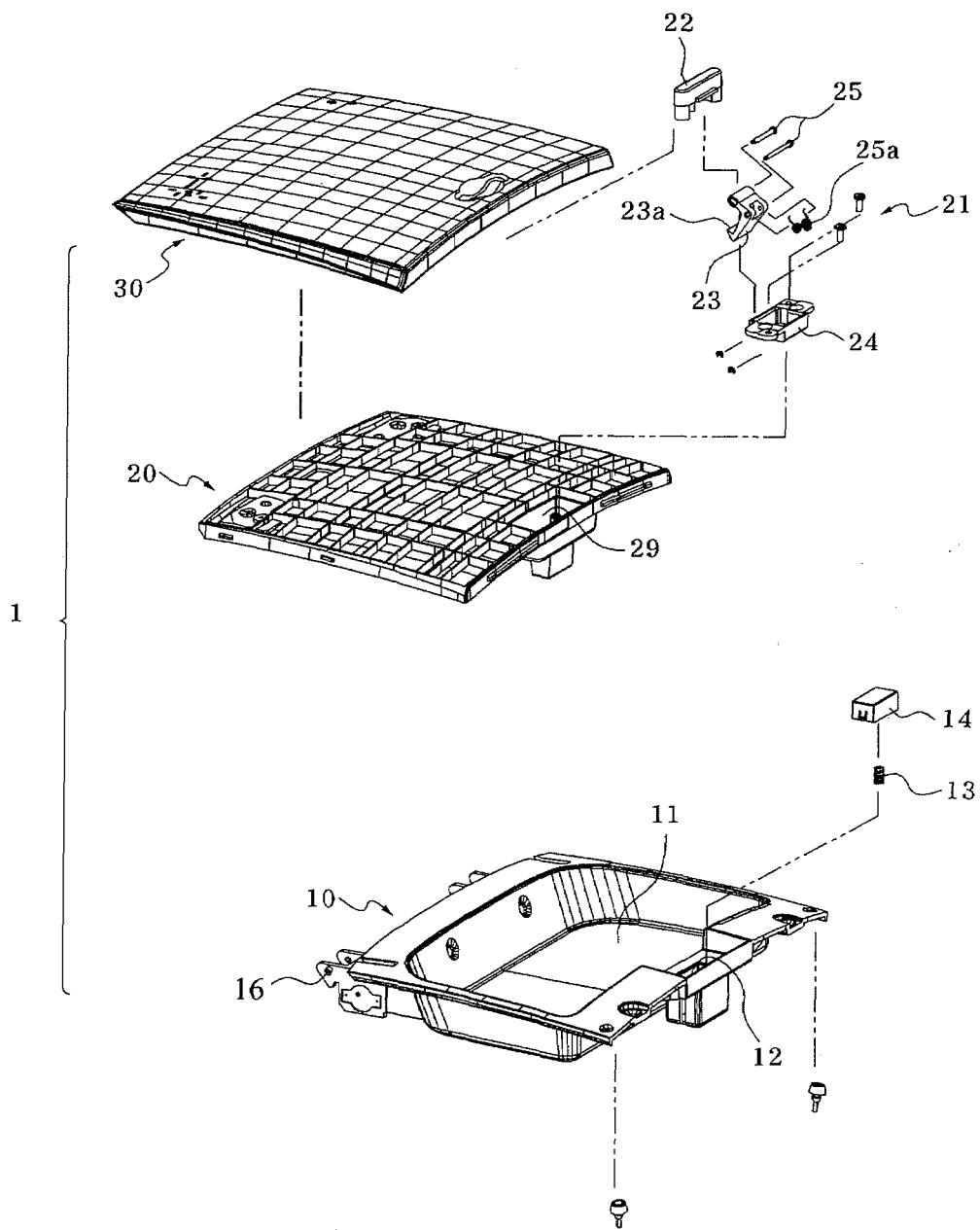
FIG. 1 is an exploded perspective view illustrating a conventional tray of a vehicle whose button is pressed down to open it.
Figure 2:
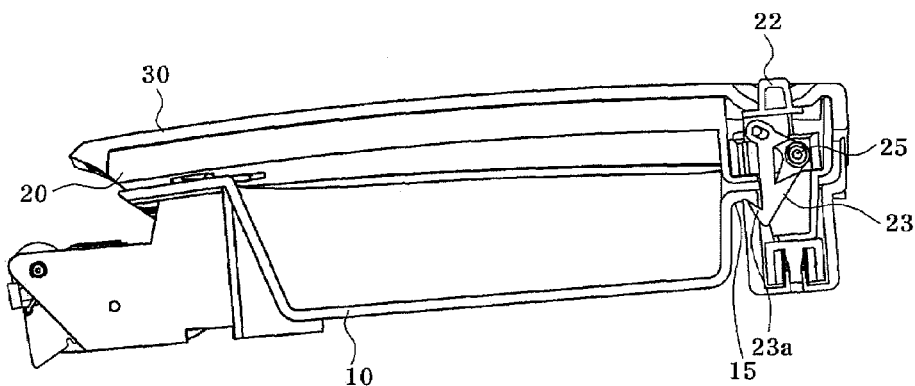
FIG. 2 is a view illustrating the button in a closed state of the tray in FIG. 1.
Figure 3:
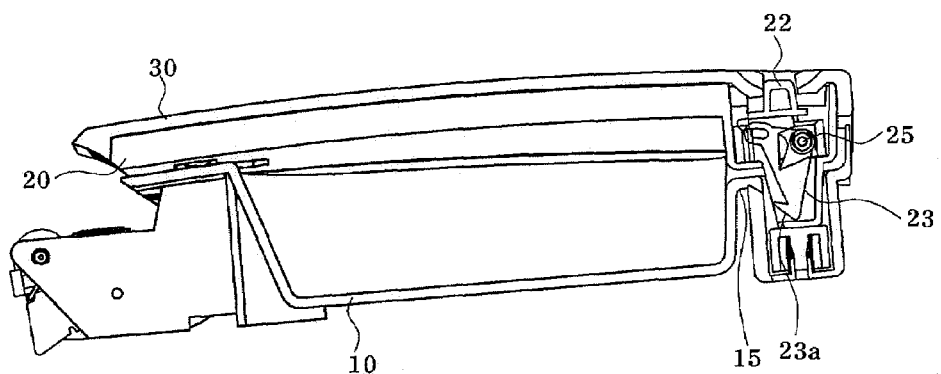
FIG. 3 is a view illustrating the button pressed down in the state shown in FIG. 2.
Figure 4:
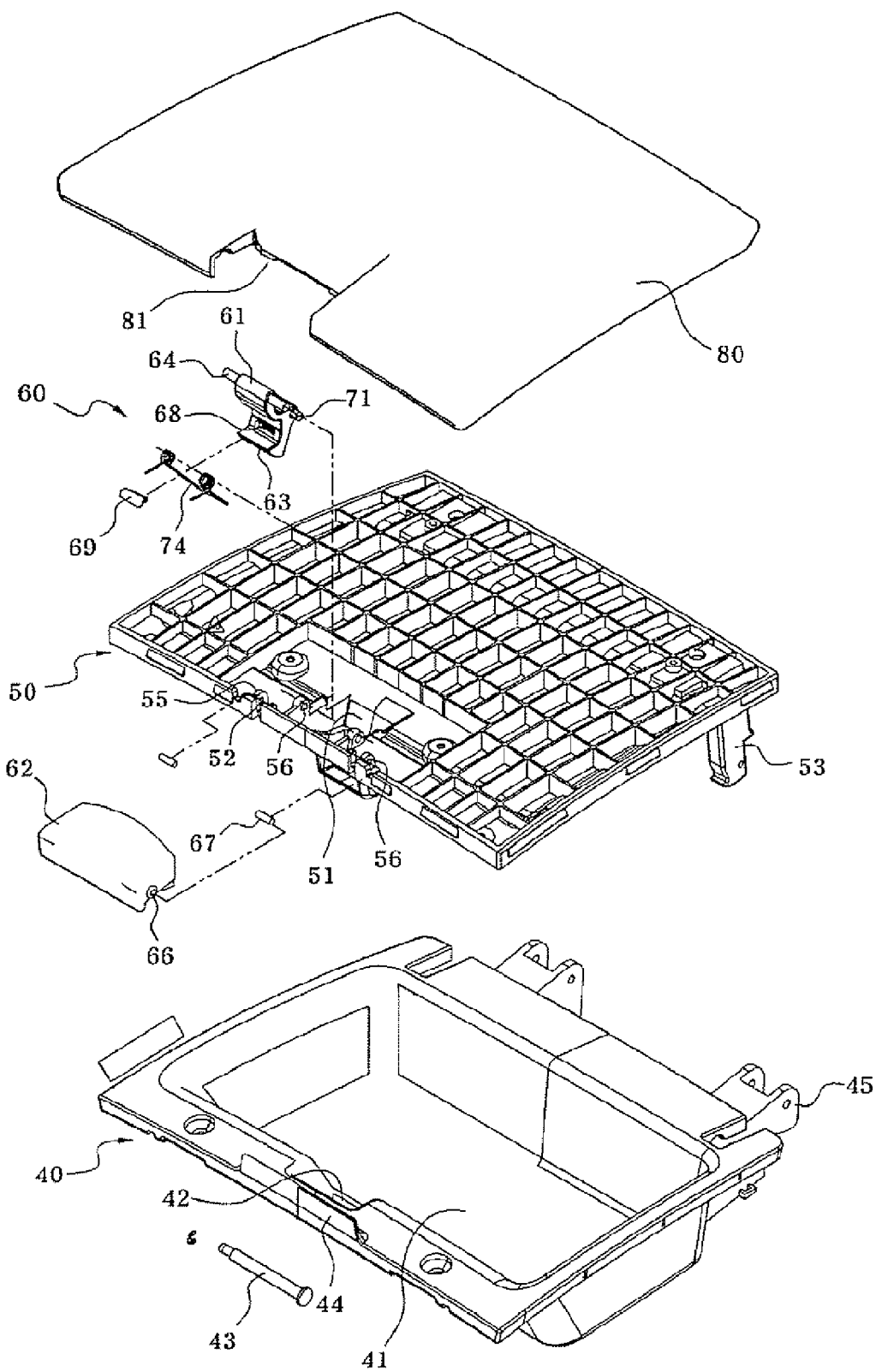
FIG. 4 is a schematic perspective view illustrating a button pulled forward to open a door according to a preferred embodiment of the present invention.
Figure 5:
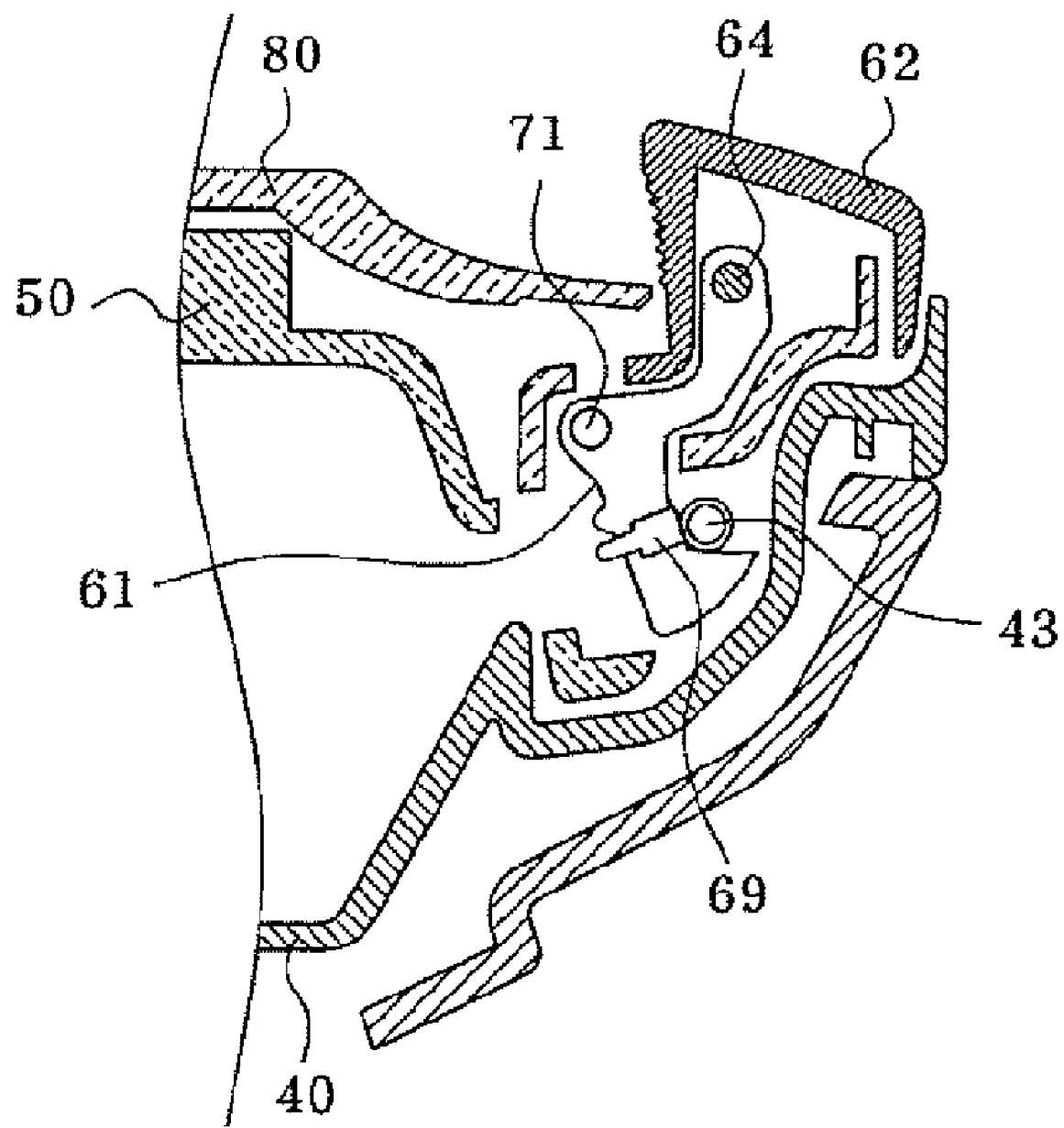
FIG. 5 is a view illustrating a locker in the closed state of a tray in FIG. 4.
Figure 6:
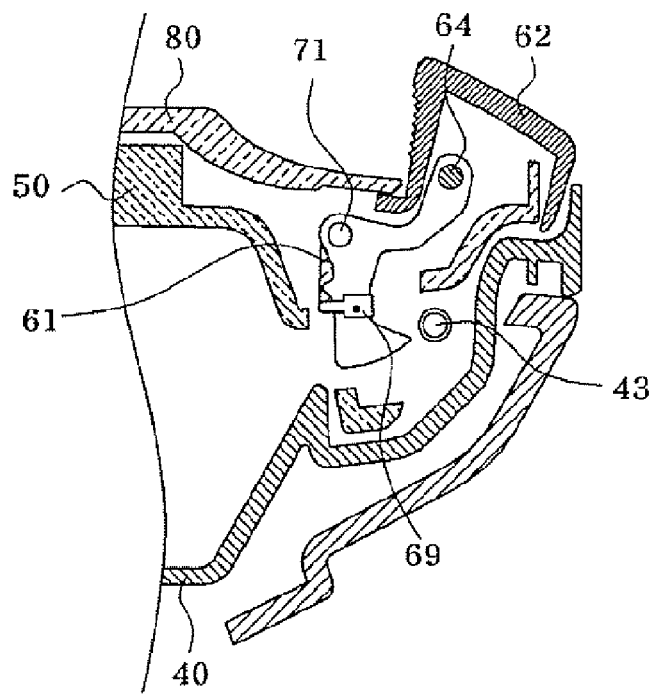
FIG. 6 is a view illustrating the button pulled down in the state shown in FIG. 4.
Figure 7:
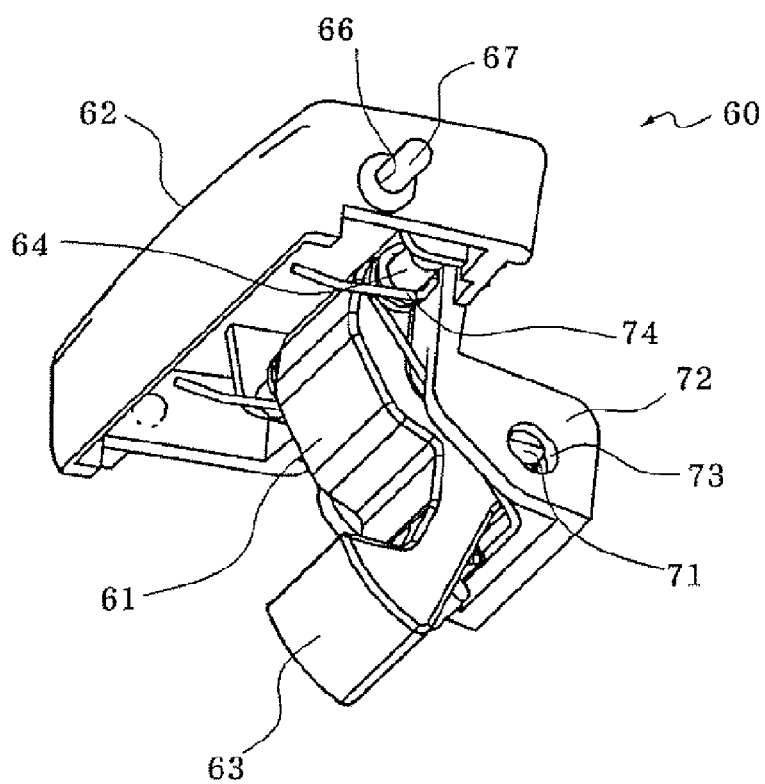
FIG. 7 is a view illustrating an assembly of the button and a locking body according to the preferred embodiment of the present invention.

FIG. 4 is a schematic perspective view illustrating a button pulled forward to open a door according to a preferred embodiment of the present invention FIG. 5 is a view illustrating a locker in the closed state of a tray in FIG. 4, FIG. 6 is a view illustrating the button pulled down in the state shown in FIG. 4, and FIG. 7 is a view illustrating an assembly of die button and a locking body according to the preferred embodiment of the present invention.

As show in the drawings, in an inner panel of a vehicle, particularly in the upper side of an instrument panel, a tray is formed to accommodate large-sized articles such as glasses for passenger's convenience.

The tray includes a housing 40, a door 50 for opening and closing the housing 40, and a locking part 60 coupled with the door 50 to lock and release the door 50 to and from the housing 40.

The housing 40 is installed in the inner panel of the vehicle, and has an accommodating room 41 for accommodating articles and an installation recess 4 formed in the font side of the housing 40 such that a part of the locking part 60 is positioned therein.

A locking bar 43 is installed to cross the installation recess 42.

The door 50 is hinged to the rear side of the housing and rotates up and down to open and close the accommodating room 41 of the housing 40. Since the hinge coupling between the housing 40 and the door 50 has a conventional structure in which the door 50 can be opened except when an external force is applied by a spring (not shown), its detail description will be omitted.

Meanwhile, the locking part 60 is installed in the front side of the door 50 positioned at the upper side of the installation recess 42 of the housing 40, and a through-hole 51 is formed in the front side of the door 50 such that the locking part 60 is positioned therein.

The lower end of the locking part 60 is locked by the locking bar 43, and is released from the locking bar when the upper end of the locking part 60 is pulled forward.

For example, the locking part 60 includes a locking body 61 and a button 62. The locking body 61 has a curved intermediate portion and a locking step 63 formed in the lower end thereof to be locked by the locking bar 43.

Moreover, the locking body 61 further includes rotation protrusions 71 protruded from intermediate lateral sides thereof.

The button 62 includes an insertion plate 72 having a pair of insertion holes 73 formed in the lower sides thereof such that the rotation protrusions 71 are respectively inserted into the insertion holes 73.

Moreover, for the coupling between the button 62 and the door 50, the button 62 has coupling holes 66 formed in the lateral sides thereof, and pins 67 inserted into the coupling holes 66 and respectively inserted into fixing grooves 52 of the door 20.

The locking body 61 has an installation hole 68 into which a pad 69 is inserted.

The pad 69 is made of elastic rubber and bought into surface contact with the surface of the locking bar 43, to absorb shock, and to prevent noise from generating.

Meanwhile, in order for the locking body 61 to rotate and to return to its original state, as shown in FIG. 7, a coupling bar 64 penetrates the upper side of the locking body 61, and a supporting plate 55 protruded from the vicinity of the through-hole 51 of the door 50 is formed with a pair of supporting holes 56 into which the coupling bar is inserted.

Restoring springs 74 surround the outer circumferences of the coupling bars 64 coupled with the locking body 61 and extend to the rotation protrusions 71 so that the restoring springs 74 are locked by the rotation protrusions 71 to have an elastic restoring force.

Meanwhile, in the front end of the housing 40, a blocking plate 44 extends upward such that the blocking plate 44 covers the front side of the button 62 to prevent the button 62 from moving forward due to shock.

An additional cover 80 is installed to cover the upper side of the door 50, and in the front end of the cover 80, an opening 81 is formed such that the button 62 of the locking part 60 protrudes trough the opening 81.

Operation and effect of the tray locking structure of a vehicle according to the preferred embodiment of the present invention will be described as follows.

The housing 40 having the accommodating room 41 is installed in the panel and a hinge 53 formed in the rear side of the door 50 in which the cover 80 is attached to the upper side of the door 50 is hinged to a coupling part 45 formed in the rear side of the housing 40 so that a tray module is formed.

In the above state, when the locking part 60 is coupled with the door 50 and the locking step 63 is locked by the locking bar 43 of the housing, as shown in FIG. 5, the door 50 keeps the accommodating room 41 of the housing 40 closed.

At that time, when a passenger pulls the button 62 of the locking part 60 forward, as shown in FIG. 6, the button 62 rotates about the pin 67 and the locking body 61 coupled with the insertion plate 72 of the button 62 is lifted up and rotated.

At that time, the locking body 61 rotates about the coupling bars 64, and due to the rotation of the locking body 61, the locking bar 43 is released from the locked state.

Moreover, due to pressure of the rotation protrusions 71 rotated by the rotation of the locking body 61, the restoring springs 74 have an elastic restoring force.

Thus, when the button 62 is pulled forward, the tray is released from the locked state. The door 50 and the housing 40 are released from their locked state, simultaneously due to the spring (not shown) installed in the hinged portion, the door 50 rotates upward to open the accommodating room 41 of the housing 40.

When the external force applied to the button 62 is removed, the locking body 61 is returned to its original position by the restoring springs 74 and the button 62 coupled with the locking body 61 is also returned to its original position.

Meanwhile, when a passenger inserts or takes an article into or from the accommodating room 41 and presses the door 50 down, the locking step 63 of the locking body 61 is pushed back by the locking bar 42 and is rotated for a moment such as when the locking part 61 is released and is returned to its original position by the restoring springs 74, so that the locking step 63 is locked by the locking bar 43 so as to be in a locked state.

At that time, the pad 69 installed in the locking body 61 contacts the locking bar 43 not only to absorb shock transmitted to the locking body 61 but also to prevent the locking bar 43 from directly contacting the locking body 61, resulting in preventing noise.

Moreover, the blocking plate 44 protruded upward from the front end of the housing 40 prevents the button 62 from being pushed to the front side thereof by the external force, resulting in further preventing the door 50 of the tray from being opened by the external shock.

As described above, according to the tray locking structure of a vehicle of the present invention, the locking part installed in the door is rotated to release the door from the locked state so that the door is prevented from opening by the external shock.

Due to this changed locking manner, conventional components become simplified so that costs for the components can be saved and the tray locking structure is easily assembled.

Meanwhile, the pad is attached to the locking part and bought into surface contact with the locking bar of the housing so that the direct contact between the locking bar and the locking part is prevented so as to reduce noise and to absorb shock.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A tray locking structure of a vehicle comprising:
    a housing installed in an inner panel of the vehicle, having an accommodating room, an installation recess formed in a front side thereof, and a locking bar that crosses the installation recess;
    a door hinged to a rear side of the housing that can move up and down to thus open and close the door; and
    a locking part installed in a front side of the door, the locking part having a locking body, coupling bars that allow rotational movement of the locking body, a locking step provided in a lower end of the locking body and locked by the locking bar, an upper end configured to be pulled forward to release the locking part from the locking bar, a plurality of rotation protrusions provided on lateral sides of the locking body, a button including an insertion plate having a plurality of insertion holes such that the rotation protrusions are respectively inserted into the insertion holes and the coupling bars of the locking part are pivotally attached to the button,
    wherein a blocking plate is provided at a front end of the housing, the blocking plate being configured to prevent the button from being pushed to a front side thereof by an external force, and to further prevent the door from being opened by an external shock, and
    wherein the button rotates about a pin and the locking body coupled with the insertion plate of the button is lifted up and rotated when the button is pulled forward.

2. The tray locking structure of a vehicle as set forth in claim 1, wherein the rotation protrusions are formed in lateral sides of an intermediate curved portion thereof.

3. The tray locking structure of a vehicle as set forth in claim 2, further comprising a pad inserted into an installation hole of the locking body to be brought into surface contact with the locking bar.

4. The tray locking structure of a vehicle as set forth in claim 3, wherein the pad comprises elastic rubber.

5. The tray locking structure of a vehicle as set forth in claim 2, further comprising:
    a plurality of coupling bars penetrating an upper side of the locking body;
    a supporting plate protruded from the door and having supporting holes into which the coupling bars are inserted; and
    a plurality of restoring springs that support the coupling bars and are locked by the rotation protrusions.

6. The tray locking structure of a vehicle as set forth in claim 1, further comprising:
    a cover attached to an upper side of the door; and
    an opening formed in the cover through which the button protrudes.

* * * * *